United States Patent
Nemati et al.

(10) Patent No.: US 10,855,744 B2
(45) Date of Patent: Dec. 1, 2020

(54) SYSTEMS AND METHODS FOR DYNAMIC FILE CREATION

(71) Applicant: Walmart Apollo, LLC, Bentonville, AR (US)

(72) Inventors: Behzad Nemati, Springdale, AR (US); Ehsan Nazarian, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 229 days.

(21) Appl. No.: 16/003,584

(22) Filed: Jun. 8, 2018

(65) Prior Publication Data
US 2018/0375922 A1 Dec. 27, 2018

Related U.S. Application Data

(60) Provisional application No. 62/522,839, filed on Jun. 21, 2017.

(51) Int. Cl.
*H04L 29/08* (2006.01)
*G06F 3/0484* (2013.01)

(52) U.S. Cl.
CPC .......... *H04L 67/06* (2013.01); *G06F 3/04847* (2013.01); *H04L 67/02* (2013.01); *H04L 67/141* (2013.01)

(58) Field of Classification Search
CPC ....... H04L 67/06; H04L 67/02; H04L 67/141; G06F 3/04847
See application file for complete search history.

(56) References Cited

U.S. PATENT DOCUMENTS

| 6,457,009 B1* | 9/2002 | Bollay .................. G06F 16/951 707/770 |
| 7,299,271 B2 | 11/2007 | Sato |
| 7,921,217 B2 | 4/2011 | Yan et al. |
| 8,150,914 B1 | 4/2012 | Taneja et al. |
| 9,374,395 B2 | 6/2016 | Barton et al. |
| 2012/0011191 A2* | 1/2012 | Kaspar .................... H04L 69/14 709/203 |
| 2012/0296882 A1 | 11/2012 | Lee |

(Continued)

FOREIGN PATENT DOCUMENTS

| CA | 2466482 C | 8/2012 |
| CA | 2886511 A1 | 12/2014 |
| WO | 2005/091161 A1 | 9/2005 |

*Primary Examiner* — Tonia L Dollinger
*Assistant Examiner* — Jihad K Boustany
(74) *Attorney, Agent, or Firm* — McCarter & English, LLP (57) ABSTRACT

A dynamic file creation including a processor coupled to a data storage device and configured to execute a content downloading module system is provided. The content downloading module is configured to acquire a source identifier associated with a data repository. The content downloading module executes a plurality of separate and distinct download content portion requests on the data repository for portions of data pursuant to user specific parameters. The content downloading module downloads the portions of the data from the data repository into the data storage device as separate and distinct intermediate data files. The content downloading module combines the separate and distinct intermediate data files corresponding to each of the portions of the data into a consolidated data file.

20 Claims, 6 Drawing Sheets

(56) References Cited

U.S. PATENT DOCUMENTS

| | | | |
|---|---|---|---|
| 2013/0097279 A1* | 4/2013 | Polis | H04L 67/00 709/217 |
| 2015/0058318 A1* | 2/2015 | Blackwell | G06F 3/04817 707/722 |
| 2017/0249318 A1* | 8/2017 | Mescal | G06F 16/25 |

* cited by examiner

SYSTEMS AND METHODS FOR DYNAMIC FILE CREATION

CROSS-REFERENCE TO RELATED PATENT APPLICATIONS

This application claims priority to U.S. Provisional Application No. 62/522,839, filed on Jun. 21, 2017, the content of which is hereby incorporated by reference in its entirety.

BACKGROUND

Many websites enable users to search for and download data based on user-defined parameters. The user can often download the data as a file. Downloading a large amount of data can take a considerable amount of time, can cause processing errors, and/or can cause the server(s) retrieving the data and creating the file to time-out or cease functioning.

BRIEF DESCRIPTION OF THE DRAWINGS

To assist those of skill in the art in making and using a storage location determination system and associated methods, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting. In the figures.

DETAILED DESCRIPTION OF EMBODIMENTS

Described in detail herein are dynamic file creation systems and methods for dynamically creating a computer file from data retrieved from a data repository. Embodiments of the dynamic file creation system can include a data storage device and a processor coupled to the data storage device. The processor is configured to execute a content downloading module. The content downloading module is associated with an enhanced browser displaying a first graphical user interface (also referred to as a first user interface) and a second graphical user interface (also referred to as a second user interface), as described below. For example, in one embodiment, the enhanced browser is a native desktop application that embeds or incorporates a browser and/or browser engine. In other embodiments, the enhanced browser is a web browser with a browser extension loaded.

Figure 3A:
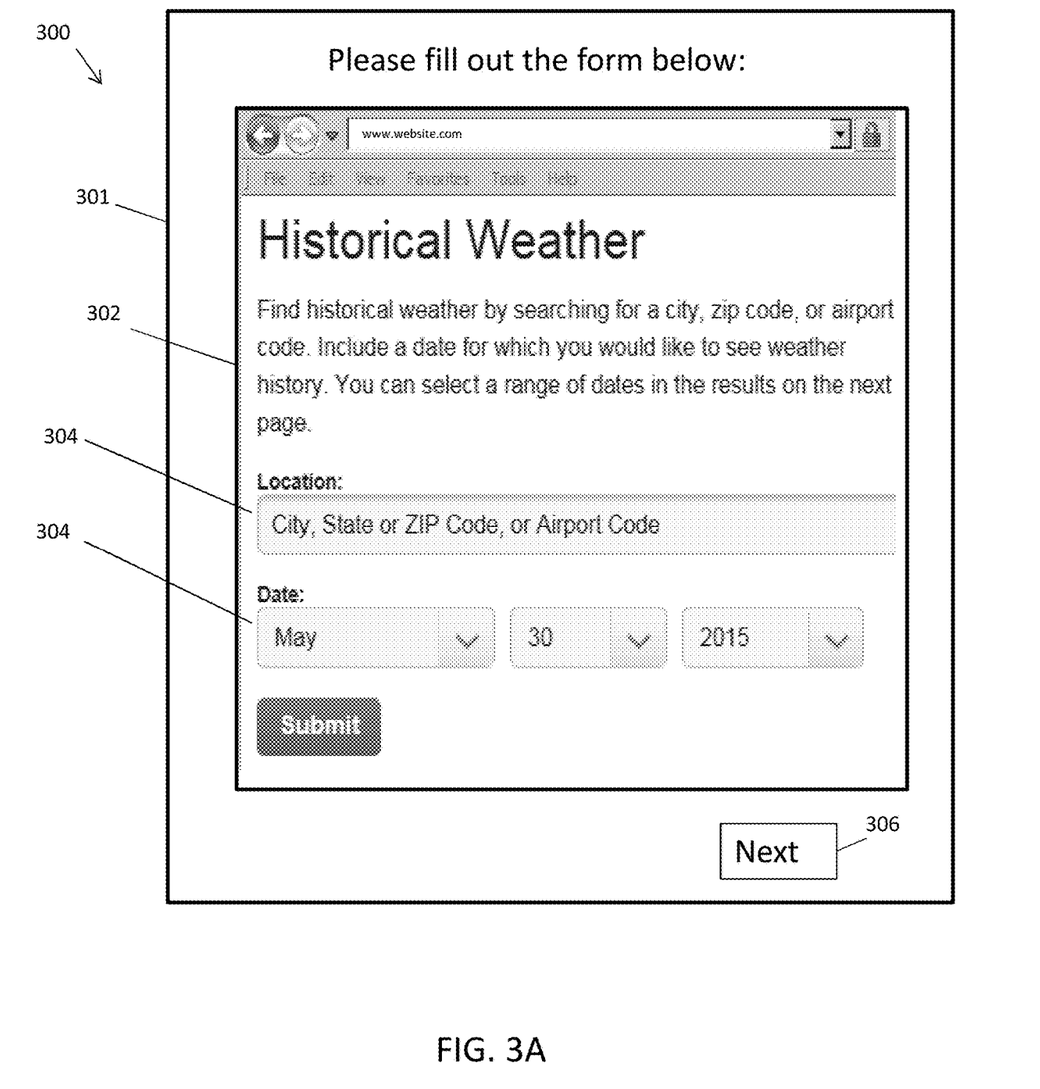
FIG. 3A-3B illustrates user interfaces for entering information to create a dynamic file, according to an exemplary embodiment.

A user enters a source identifier associated with a data repository in the enhanced browser. The source identifier can be a network address or a uniform resource locator (URL) address associated with the data repository. For example, the URL may be a webpage used to download data from the data repository. The enhanced browser presents a user with a first user interface displaying a webpage associated with the source identifier, as shown in FIG. 3A. The webpage is associated with the data repository. For example, the webpage displays content delivery fields associated with downloading data from the data repository. In one embodiment, the enhanced browser prompts the user to fill out the webpage. The content downloading module receives the source identifier and the information entered into the webpage. The user then selects to proceed with dynamically generating the computer file, for example, by pressing a button at a bottom of the first user interface labeled "next."

The content downloading module analyzes the source code associated with the source identifier to identify content delivery fields associated with downloading data from the data repository. For example, the content downloading module analyzes source code associated with a website associated with the source identifier by receiving a hypertext markup language (HTML) associated with the source identifier, and analyzing the HTML for content delivery fields associated with downloading data.

Figure 3B:
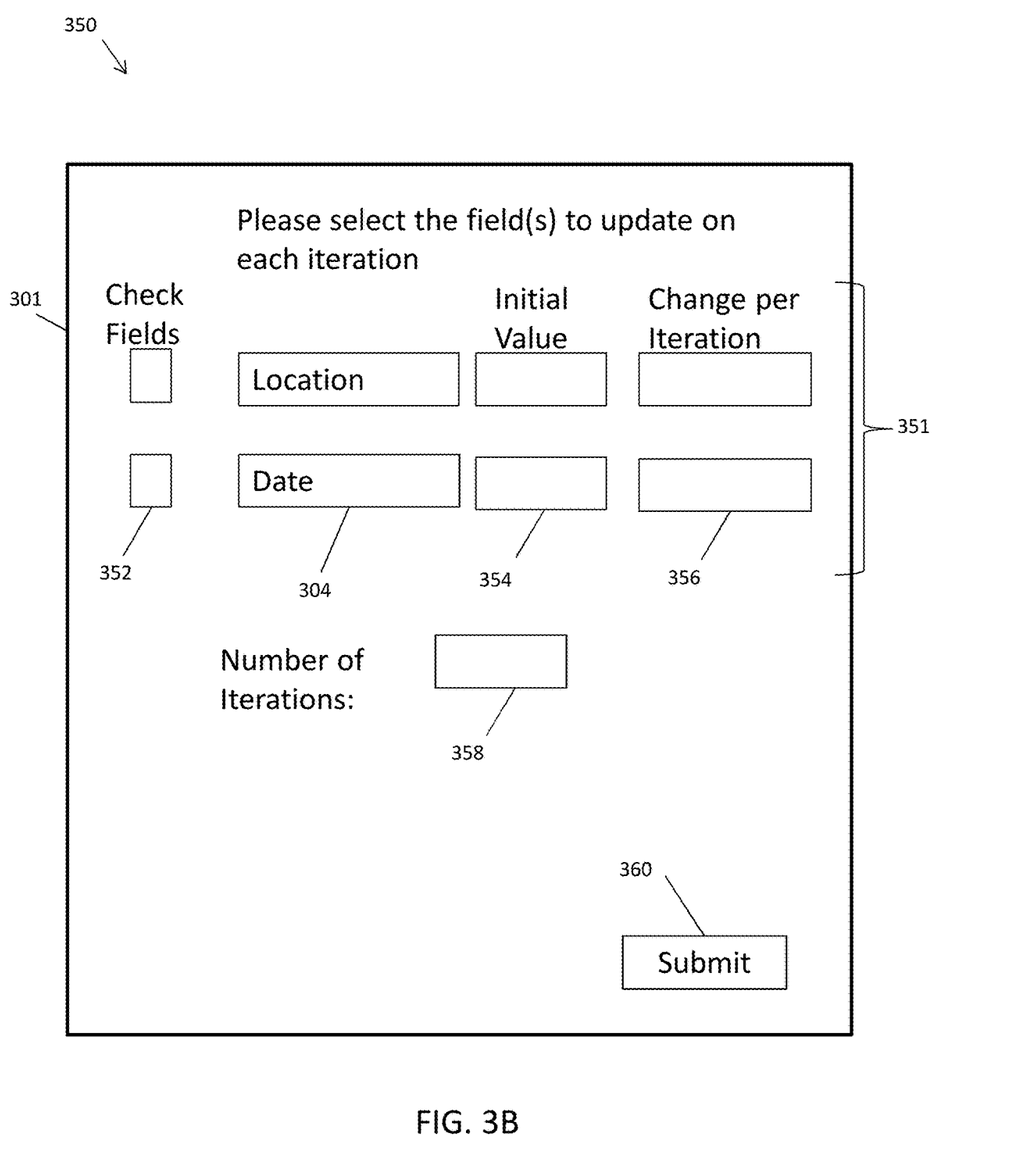

After selecting to proceed with generating the computer file, embodiments of the system can navigate to a second user interface within the enhanced browser and can generate and render user input fields associated with the identified content delivery fields, as shown in FIG. 3B. The user input fields are configured to receive user specific parameters for downloading portions of data. The user specific parameters can include, for example, at least an iteration quantity indicating a number of portions into which the data are partitioned and a change/interval for each iteration. The user then submits the user specific parameters by, for example, clicking a button labeled "submit." The content downloading module receives the user specific parameters entered into the user input fields.

The content downloading module executes separate and distinct download content portion requests on the data repository for each portion of the data pursuant to the information entered into the webpage and the user specific parameters. For example, the content downloading module may submit requests to a download server associated with the data repository based on the information entered into the webpage and the user specific parameters. The content downloading module downloads the portions of the data from the data repository into the data storage device. Each of the portions of the data is stored in the data storage device as separate and distinct intermediate data files.

In one embodiment, the content downloading module is configured to execute the download content portion requests by generating a separate browser window for each request in a web browser associated with the source identifier. Based on the iteration quantity, the content downloading module inserts the user specific parameters into each of the browser windows of the web browser. For example, the content downloading module may generate HTML documents that include the user specific parameters for each iteration and any other necessary information. Each browser window downloads a portion of the data. The content downloading module then executes each browser window in sequence or concurrently.

In another embodiment, the content downloading module is configured to execute the download content portion requests by generating a browser window in a web browser associated with the source identifier, and iteratively looping through the portions of the data using the browser window by passing the user specific parameters as input parameters to the browser window, wherein each loop iteration includes the change/interval for each iteration. For each iteration, the content downloading module transmits respectively download content portion requests to the download server, and downloads the portion of data. As a result, the portion of data that have not been downloaded need to be requested continuously after one of the portions of data is downloaded completely.

In some embodiments, the content downloading module maintains a table for recording a download status of each portion of data. When at least one download content portion request for a portion of data is transmitted to the data repository, a download status of the at least one download content portion request is changed to "downloading". After the entire portion of data is received from the data repository, the status of the portion of data is changed to "complete", and a new download content portion request is transmitted to the data repository to download a next portion of data.

The content downloading module combines the portions of data locally to form the consolidated data file after receiving all the portions of data. The content downloading module is configured to combine the separate and distinct intermediate data files corresponding to each of the portions of the data into a consolidated data file based on the user specific parameters. The consolidated data file is stored in the data storage device.

In some embodiments, the download content portion requests are issued over multiple network connections. In these embodiments, the content downloading module receives the portions of the data over the multiple network connections. In such an embodiment, at least two of the portions of the data are received simultaneously or near simultaneously over separate network connections of the multiple network connections.

The described system and method increases the download speed by requesting each part of download content in parallel. In a manual process, a user fills out a form n times and run each batch one after the other. The runtime difference between the manual process and the dynamic file creation system described herein depends on the situation, but the dynamic file creation system can take a fraction of the time of the manual process. In a best case scenario, assuming there are "n" batches per iterations, the manual process can take over n times longer to run compared to the dynamic file creation system, as the dynamic file creation system requires the user to fill out the request form once and all batches can be pulled simultaneously as opposed to the manual process of filling out the form n times and running each batch one after the other. The dynamic file creation system also removes a significant amount of risk due to human error, since the form is filled out only once.

Moreover, when large volumes of data are requested, a database server can freeze or cease function due to resource constraints. Similarly, the database server may time-out if results are not returned within a specified time of submitting the request, or a runtime error may occur. Separating a request for a large volume of data into smaller iterative requests allows the database server to prioritize and queue requests and to allocate resource to complete each request.

Figure 1:
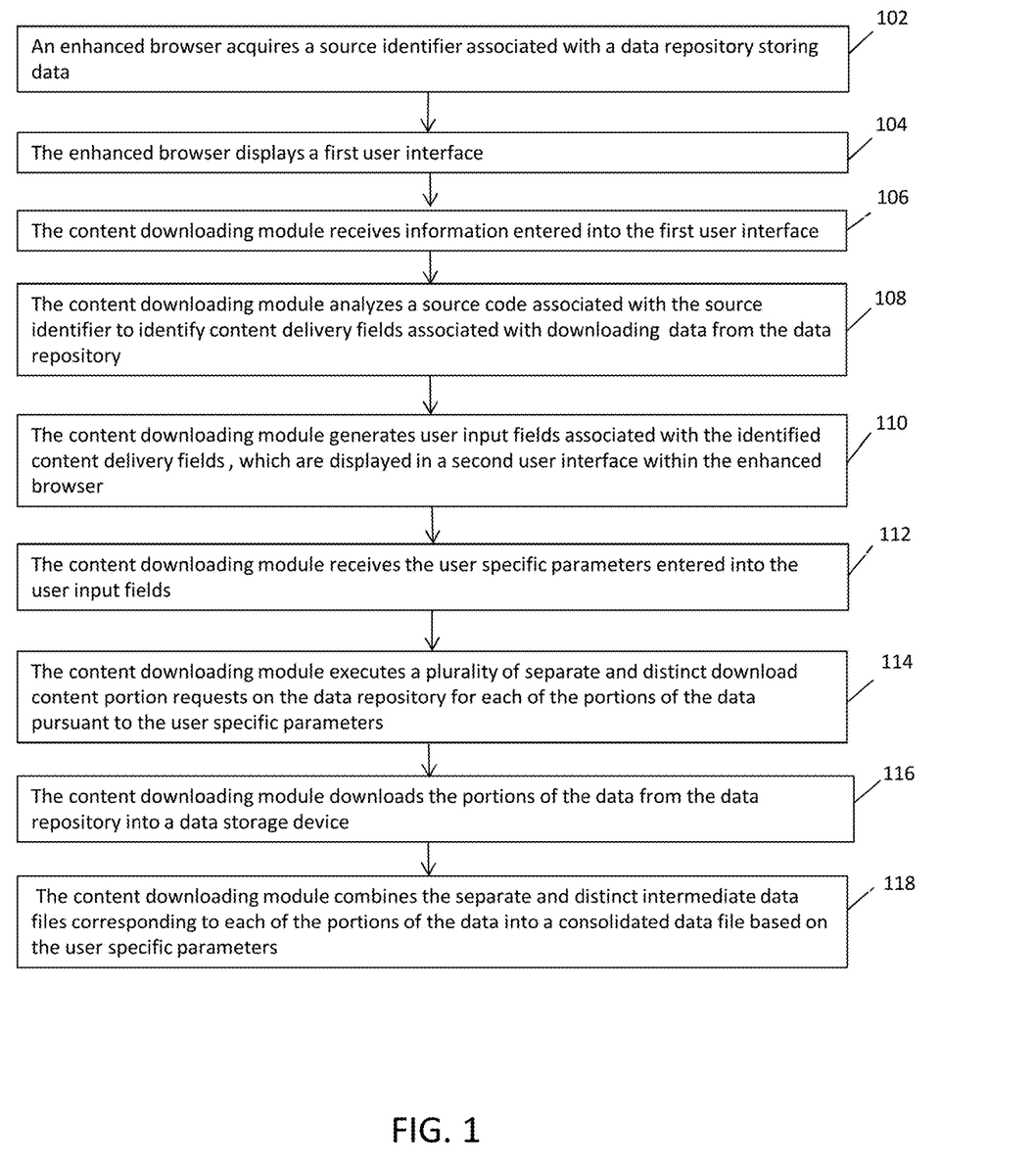
FIG. 1 illustrates a method for creating dynamic files, according to an exemplary embodiment.

FIG. 1 illustrates a method for creating dynamic files, according to an exemplary embodiment. At step 102, an enhanced browser associated with a content downloading module acquires a source identifier associated with a data repository storing data. At step 104, the enhanced browser displays a first user interface that includes a webpage associated with the data repository. A user enters required information into the webpage. At step 106, the content downloading module receives the information entered into the first user interface. At step 108, the content downloading module analyzes source code (for example, HTML source code) associated with the webpage to identify content delivery fields associated with downloading data from the data repository.

At step 110, the content downloading module generates a second user interface within the enhanced browser that includes user input fields associated with the identified content delivery fields. The user input fields are configured to receive user specific parameters for downloading the portions of data. The user specific parameters includes at least an iteration quantity indicating a number of portions into which the data is partitioned and a change for each iteration. At step 112, the content downloading module receives the user specific parameters entered into the user input fields. At step 114, the content downloading module executes separate and distinct download content portion requests on the data repository for each of the portions of the data pursuant to the user specific parameters. In some embodiments, the data repository is associated with one or more database servers that provide the portions of data.

At step 116, the content downloading module downloads the portions of the data from the data repository into a data storage device. For example, the content downloading module submit iterative requests for data in the data repository based on specified ranges, and for each request a database server returns to the content downloading module an intermediate data file that includes the set of data corresponding to the range specified for the request. Each of the portions of the data is stored in the data storage device as separate and distinct intermediate data files. Prior to the request for the portions of data and the generation of intermediate data files, the data is not stored in corresponding files. For example, the data in the data repository or data storage can be stored in tables, rows, columns, and the like, where the requests include the information necessary for retrieving the data from the data repository or data storage device.

At step 118, the content downloading module combines the separate and distinct intermediate data files corresponding to each of the portions of the data into a consolidated data file based on the user specific parameters, the consolidated data file being stored in the data storage device. For example, the content downloading module gathers up all of the intermediate data files and generates the consolidated file. More specifically, the content downloading module opens a new file of a same type matching the downloaded intermediate data files. The new file is the consolidated data file. The content downloading module opens and reads each of the intermediate data files, one at a time, and copies the contents of each intermediate data file into the new file. The content downloading module opens an intermediate data file, copies the content of the intermediate data file into the new file, closes the intermediate data file, and then opens the next intermediate data file and repeats the process.

Figure 2:
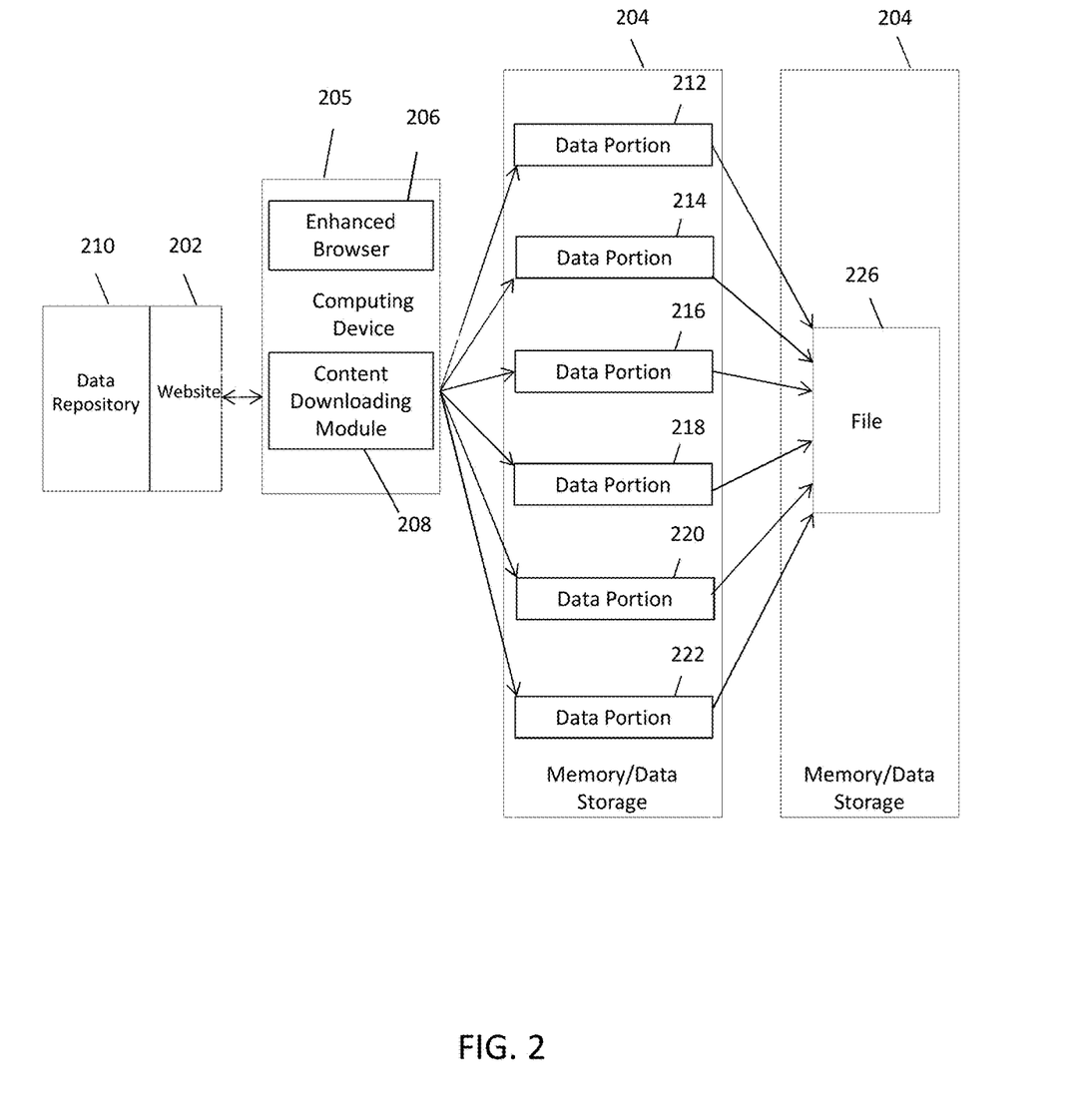
FIG. 2 illustrates a dataflow for creating dynamic files, according to an exemplary embodiment.

FIG. 2 illustrates an exemplary network for dynamically generating a computer file 226 from a discrete data stored in a data repository 210, according to an exemplary embodiment. A processor on a user computing system 205 executes a content downloading module 208 and acquires a source identifier associated with the data repository 210. For example, a user enters an address of a webpage into an enhanced browser 206 coupled to a content downloading module 208. The enhanced browser 206 displays a first user interface that includes the webpage associated with the data repository. A user enters required information into the webpage.

The content downloading module 208 identifies content delivery fields associated with downloading data from the data repository from the website 202 by reading the HTML code of the webpage 202 and extracting elements. The content downloading module 208 generates a second user interface within enhanced browser 206 that includes user input fields associated with the identified content delivery fields. The user input fields are configured to receive user specific parameters for downloading the portions of data. The content downloading module 208 receives the user specific parameters entered into the user input fields.

The content downloading module 208, simultaneously or through looping, submits separate and distinct download content portion requests on the data repository 210 for each of the portions of the data. For example, in one embodiment, the content downloading module 208 connects to the webpage 202 multiple times, each time automatically filling out the page with collected parameters and submitting data requests to the data repository 210 to retrieve a set of data associated with the collected parameters. In the illustrated embodiment, the content downloading module 208 can receive six portions of data 212, 214, 216, 218, 220, and 222; one for each iterative request submitted to the data repository 210. The six portions of data 212, 214, 216, 218, 220, and 222 are each stored in contemporaneously created intermediate data files in a memory or data storage 204. The intermediate data files do not exist before the discrete data is retrieved and formatted into files in response to each request. The intermediate data files are dynamically created in response to the request and include discrete data corresponding to the particular request for which the data was retrieved.

Once all the requested data is received by the content downloading module 208 from the data repository 210, the content downloading module 208 combines the portions of data 212, 214, 216, 218, 220, and 222 into a file 226. The file 226 is saved to the memory or the data storage 204.

FIG. 3A illustrates a first user interface 300 shown within an enhanced browser 301 for submitting a dynamic file request, according to an exemplary embodiment. In an exemplary embodiment, the first user interface 300 displays a webpage 302 that includes one or more content delivery fields 304 associated with downloading data from a data repository. The enhanced browser 301 can prompts the user to complete the webpage 302. The user completes the webpage 302, including the one or more content delivery fields 304. For example, in FIG. 3A, the user provides a location and a date for downloading weather data. This information provided by the user is used to fill out the content delivery fields when performing the iterations, as described herein. The user then selects to proceed with generating the dynamic file, for example, by pressing a button 306 at a bottom of the first user interface 300 labeled "next."

The first user interface 300 is generated within the enhanced browser 301 by the content downloading module 208. The enhanced browser 301 re-creates the webpage 302 by using and showing the hypertext markup language (HTML) contents of the webpage 302 in the enhanced browser 301. The user navigates to a desired webpage through the enhanced browser 301. The content downloading module 208 collects the website data and HTML code and uses it to populate the second user interface shown in FIG. 3B and further described herein.

FIG. 3B illustrates a second user interface 350 shown within an enhanced browser 301 for submitting a dynamic file request, according to an exemplary embodiment. The content downloading module 208 analyzes a source code associated with the webpage 302 to identify content delivery fields 304 associated with downloading data from the data repository. More particularly, the content downloading module 208 analyzes the source code associated with the webpage 302 by receiving a HTML associated with the webpage 302, and analyzing the HTML for content delivery fields 304 associated with downloading the portions of data.

The content downloading module 208 is configured to create user input fields 351 based on the content delivery fields 304. After selecting to proceed with generating the dynamic file as shown in FIG. 3A, the user is taken to the second user interface 350 that displays the user input fields 351 associated with the one or more identified content delivery fields 304. The user input fields 351 are configured to receive user specific parameters for downloading the portions of data. For example, as shown in FIG. 3B, the user specific parameters include an option 352 to select one or more content delivery fields 304, an initial value 354 for each content delivery field, a change for each iteration 356, and a number of iterations 358 indicating a number of portions into which the data is partitioned. For example, the user may select the "date" field, enter an initial value of May 30, 2015, a change per iteration of one day, and a number of iterations of 365. At the bottom of the second user interface 350, the user selects a button 360 labeled "submit" to create the dynamic file based on the user specific parameters.

The content downloading module 208 receives the user specific parameters entered into the second user interface 350. The content downloading module 208 executes separate and distinct download content portion requests on the data repository for each of the portions of the data pursuant to the user specific parameters. The content downloading module 208 downloads the portions of the data pursuant to a first embodiment and/or a second embodiment, described below.

In the first embodiment, the content downloading module is configured to execute the download content portion requests by generating browser windows in a web browser associated with the source identifier. Based on the iteration quantity, the content downloading module inserts the user specific parameters into each of the browser windows of the web browser, wherein each browser window downloads a portion of the data. For example, the content downloading module may generate the HTML documents that include this configuration information. The content downloading module then executes each browser window in sequence or concurrently.

In the second embodiment, the content downloading module is configured to execute the download content portion requests by generating a browser window in a web browser associated with the source identifier, and iteratively looping through the portions of the data using the browser window by passing the user specific parameters as input parameters to the browser window, wherein each loop iteration includes the change for each iteration. For each iteration, the content downloading module transmits respectively download content portion requests to the download server, and downloads the portion of data. As a result, the portions of data that have not been downloaded need to be requested continuously after one portion of data is downloaded completely.

The content downloading module 208 downloads the portions of the data from the data repository (i.e., data repository 210) into the storage device (i.e., data storage 204). Each portion of data is an intermediate data file. Each of the portions of the data is stored in the data storage device as separate, distinct, and contemporaneously created intermediate data files. In the example above, the content downloading module 208 downloads data for each day from May 29, 2015 to May 29, 2016 (i.e., 365 iterations with a one day change per iteration).

The content downloading module 208 combines the portions of data locally to form the consolidated data file after receiving all the portions of data. The content downloading module 208 combines the separate and distinct intermediate data files corresponding to each of the portions of the data into a consolidated data file based on the user specific parameters, the consolidated data file being stored in the data storage device. In the present example, a data file is created that includes downloaded data for each day from May 29, 2015 to May 29, 2016.

Figure 4:
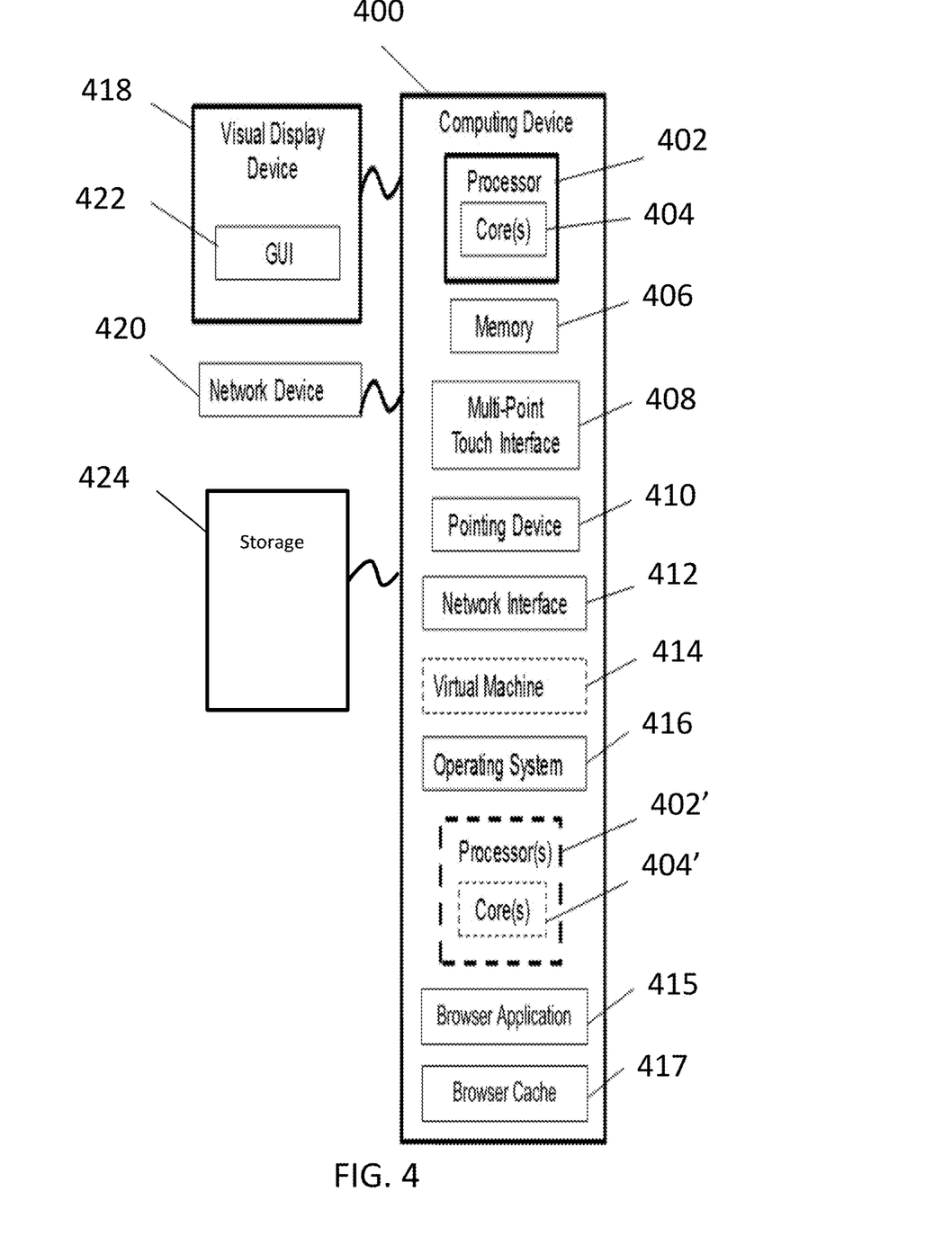
FIG. 4 is a schematic view of a computing device used in creating dynamic files, according to an exemplary embodiment.

FIG. 4 is a block diagram of an example computing device 400 that can be used to perform one or more steps of the systems and methods provided by exemplary embodiments. In an exemplary embodiment, computing device 400 includes a processor 402 executing a content downloading module 208. Computing device 400 includes one or more non-transitory computer-readable media for storing one or more computer-executable instructions or software for implementing exemplary embodiments such as the prioritization module described herein. The non-transitory computer-readable media can include, but are not limited to, one or more types of hardware memory, non-transitory tangible media (for example, one or more magnetic storage disks, one or more optical disks, one or more USB flash drives), and the like. For example, a memory 406 included in computing device 400 can store computer-readable and computer-executable instructions or software for implementing exemplary embodiments such as the content downloading module 208 described herein. Computing device 400 also includes a core 404 associated with processor 402, and optionally, one or more additional processor(s) 402' and associated core(s) 404' (for example, in the case of computer systems having multiple processors/cores), for executing computer-readable and computer-executable instructions or software stored in memory 406 and other programs for controlling system hardware. Processor 402 and processor(s) 402' can each be a single core processor or multiple core (404 and 404') processor.

Computing device 400 may include an enhanced browser application 415 and a browser cache 417. As described above, the enhanced browser application 415 can enable a user to view user interfaces, such as the first user interface 300 and the second user interface 350.

Virtualization can be employed in computing device 400 so that infrastructure and resources in the computing device can be shared dynamically. A virtual machine 414 can be provided to handle a process running on multiple processors so that the process appears to be using only one computing resource rather than multiple computing resources. Multiple virtual machines can also be used with one processor.

Memory 406 can include a computer system memory or random access memory, such as DRAM, SRAM, EDO RAM, and the like. Memory 406 can include other types of memory as well, or combinations thereof. In some embodiments, a user can interact with computing device 400 through a visual display device 418, such as a touch screen display or computer monitor, which can display one or more user interfaces, such as the first user interface and the second user interface, that can be provided in accordance with exemplary embodiments, for example, the exemplary user interfaces illustrated in FIG. 3A-3B. Visual display device 418 may also display other aspects, elements and/or information or data associated with exemplary embodiments. Computing device 400 may include other I/O devices for receiving input from a user, for example, a keyboard or any suitable multi-point touch interface 408, a pointing device 410 (e.g., a pen, stylus, mouse, or trackpad). The keyboard 408 and pointing device 410 may be coupled to visual display device 418. Computing device 400 may include other suitable conventional I/O peripherals.

Computing device 400 can also include one or more storage devices 424, such as a hard-drive, CD-ROM, or other computer readable media, for storing data and computer-readable instructions and/or software that implements embodiments of the specialized computer file system, as described herein, or portions thereof. Exemplary storage device 424 can also store one or more storage devices for storing any suitable information required to implement exemplary embodiments. For example, storage device 424 and/or memory 406 store portions of data (e.g., portions of data 212, 214, 216, 218, 220, and 222) and/or files (e.g., file 226).

Computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 can include a built-in network adapter, network interface card, PCMCIA network card, card bus network adapter, wireless network adapter, USB network adapter, modem or any other device suitable for interfacing computing device 400 to any type of network capable of communication and performing the operations described herein. Moreover, computing device 400 can be any computer system, such as a workstation, desktop computer, storage server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Computing device 400 can run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 416 can be run in native mode or emulated mode. In an exemplary embodiment, the operating system 416 can be run on one or more cloud machine instances.

Figure 5:
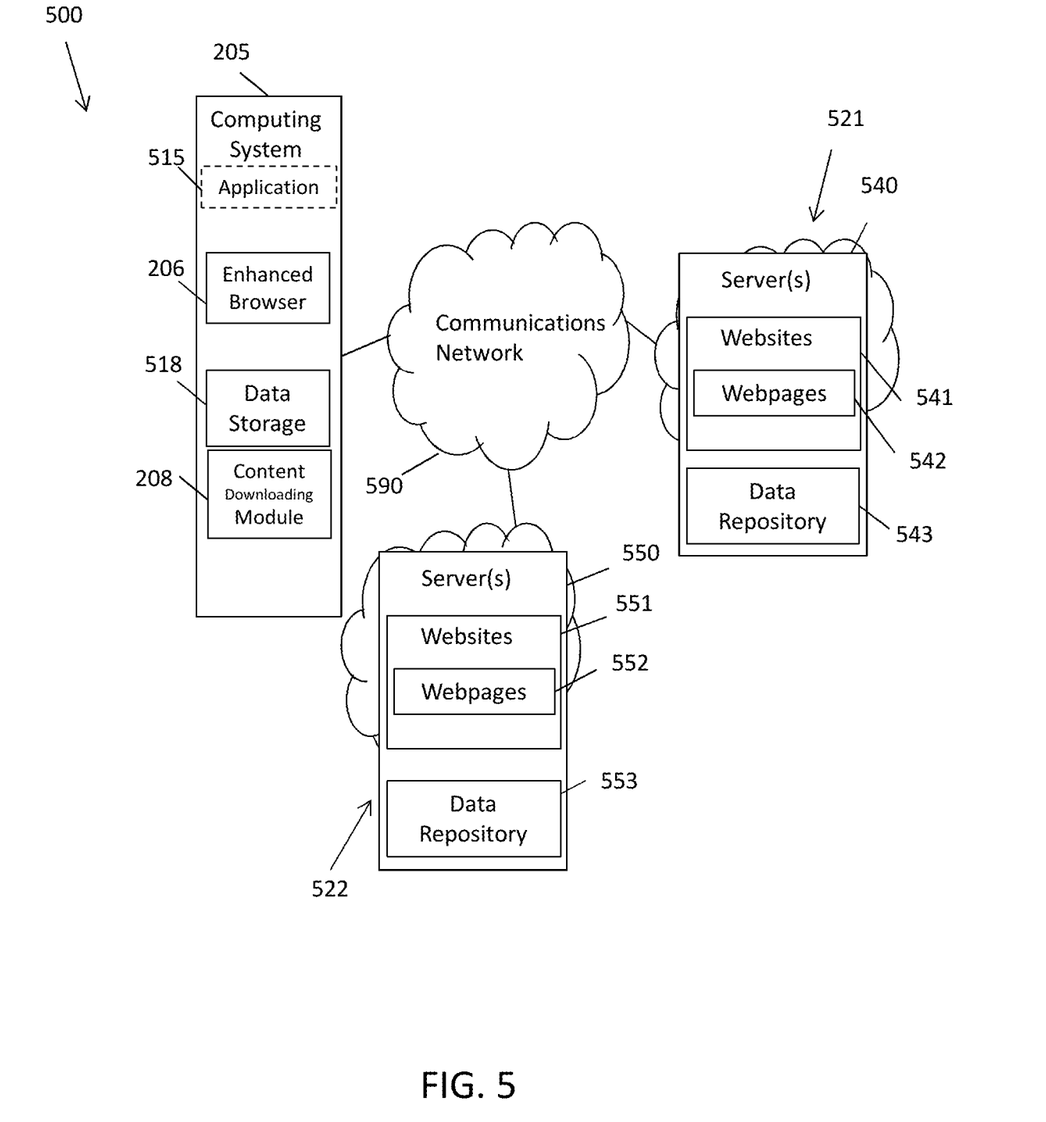
FIG. 5 is an exemplary networked environment for creating dynamic files, according to an exemplary embodiment.

FIG. 5 is an exemplary networked environment 500 for creating dynamic files, in accordance with embodiments of the present disclosure. The environment 500 includes user computing system 205, remote computing systems 521 and 522, and a communications network 590.

The user computing system 205 executes an enhanced browser 206. For example, the enhanced browser 206 may be implemented as a native desktop application 515 on the user computing system 205 that embeds or incorporates a browser and/or browser engine. In other embodiments, the enhanced browser 206 is a web browser with a browser extension loaded. The user computing system 205 interfaces with the remote computing systems 521 and 522, for example, using application 515. The user computing system 205 further includes a data storage 518, such as data storage 204 shown in FIG. 2. Although data storage 518 is shown as within user computing system 205, in alternative embodiments data storage 518 can exist remote from user computing system 205.

The remote computing systems 521 and 522 can include one or more servers 540 and 550 that can function as database servers and/or web servers, and can include one or more data repositories 543 and 553. For example, in one embodiment, the remote computing systems 521 and 522 can include one or more database servers 540 and 550, respectively that are configured to provide data from the data repositories 543 and 553. In another embodiment, the remote computing systems 521 and 522 can include one or more servers 540 and 550, respectively, configured to host digital content. For example, the one or more servers 540 and 550 can be implemented as web servers that are configured to host websites 541 and 551, respectively, where the websites 541 and 551 each include webpages 542 and 552, respectively.

The enhanced browser 206 implemented by the user computing system 205 can be configured to navigate to the websites 541 and 551 hosted by the servers 540 and 550, respectively. Those skilled in the art will recognize that data repositories 543 and 553 can be incorporated into the servers 540 and 550, respectively, such that each server includes a data repository.

The user computing system 205 can interact with the one or more servers 540 and 550 to access and retrieve portions of data. The enhanced browser 206 can establish a connection with a remote computing system, such as remote computing systems 521 and/or 522, to retrieve the portions of data from the data repositories 543 and 553, as described herein. In an exemplary embodiment, the enhanced browser 206 can navigate to a webpage 542 or 552 having an associated URL by querying of the servers of the remote computing system 521 or 522 based on the URL. The queried server can return a webpage to the user computing system 205 executing the enhanced browser 206, which can render the webpage in a browser window (i.e., the first user interface) of the enhanced browser 206 and store an in-memory version of the source code for the webpage in memory (e.g., in the memory associated with the user computing system 205). In response to the enhance browser 206 navigating to the webpage 542 or 552, the content downloading module 208 of the user computing system 205 can incorporate the HTML of the webpage into a second user interface.

The user computing system 205 transmits the database queries, via webpages 542 and/or 552, to the one or more servers 540 and 550. The results of the one or more queries can be transmitted back to the user computing system 205 by the one or more servers 540 and 550.

The communications network 590 can be any network over which information can be transmitted between devices communicatively coupled to the network. For example, the communication network 590 can be the Internet, an Intranet, virtual private network (VPN), wide area network (WAN), local area network (LAN), and the like.

The description herein is presented to enable any person skilled in the art to create and use a computer system configuration and related method and systems for improving access to electronic data. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that embodiments of the present disclosure may be practiced without the use of these specific details. In other instances, well-known structures and processes are shown in block diagram form in order not to obscure the description of embodiments of the present disclosure with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. A dynamic file creation system comprising:
 a data storage device;
 a processor coupled to the data storage device and configured to execute a content downloading module, the content downloading module configured to:
  acquire a source identifier associated with a data repository storing data;
  analyze a source code associated with the data repository to identify content delivery fields associated with downloading data from the data repository;
  generate user input fields associated with the identified content delivery fields, the user input fields configured to receive user specific parameters for downloading portions of data, the user specific parameters including at least an iteration quantity indicating a number of portions into which the portions of the data are partitioned and a change for each iteration;
  receive the user specific parameters entered into the user input fields;

execute a plurality of separate and distinct download content portion requests on the data repository for each of the portions of the data pursuant to the user specific parameters;

download the portions of the data from the data repository into the data storage device, each of the portions of the data being stored in the data storage device as separate and distinct intermediate data files; and combine the separate and distinct intermediate data files corresponding to each of the portions of the data into a consolidated data file based on the user specific parameters, the consolidated data file being stored in the data storage device.

2. The system of claim 1, the content downloading module further configured to execute the plurality of download content portion requests by:

generating a plurality of browser windows in a web browser associated with the source identifier and based on the iteration quantity;

inserting the user specific parameters into each of the browser windows of the web browser, wherein each browser window downloads a portion of the data; and executing each browser window in sequence or concurrently.

3. The system of claim 1, the content downloading module further configured to execute the plurality of download content portion requests by:

generating a browser window in a web browser associated with the source identifier; and iteratively looping through the portions of the data using the browser window by passing the user specific parameters as input parameters to the browser window, wherein each loop iteration includes the change for each iteration.

4. The system of claim 1, the content downloading module further configured to:

divide the portions of the data into equal-size download content portions according to the entered iteration quantity.

5. The system of claim 1, wherein the source identifier is a network address or a uniform resource locator (URL) address associated with the data repository.

6. The system of claim 1, wherein the plurality of download content portion requests are issued over multiple network connections.

7. The system of claim 6, the content downloading module further configured to:

receive the portions of the data over the multiple network connections, wherein at least two of the portions of the data are received simultaneously over separate network connections of the multiple network connections.

8. The system of claim 1, the content downloading module further configured to analyze the source code associated with the source identifier by:

receiving a hypertext markup language (HTML) associated with the source identifier; and analyzing the HTML for content delivery fields associated with downloading the portions of the data.

9. The system of claim 1, the content downloading module further configured to:

record and maintain download status information of the portions of the data.

10. The system of claim 1, further comprising an enhanced browser, wherein the content downloading module acquires the source identifier and receives the user specific parameters using the enhanced browser.

11. A method for creating dynamic files comprising:

acquiring, by a content downloading module, a source identifier associated with a data repository storing data;

analyzing, by the content downloading module, a source code associated with the data repository to identify content delivery fields associated with downloading data from the data repository;

generating, by the content downloading module, user input fields associated with the identified content delivery fields, the user input fields configured to receive user specific parameters for downloading portions of data, the user specific parameters including at least an iteration quantity indicating a number of portions into which the portions of the data are partitioned and a change for each iteration;

receiving, by the content downloading module, the user specific parameters entered into the user input fields;

executing, by the content downloading module, a plurality of separate and distinct download content portion requests on the data repository for each of the portions of the data pursuant to the user specific parameters;

downloading, by the content downloading module, the portions of the data from the data repository into a data storage device, each of the portions of the data being stored in the data storage device as separate and distinct intermediate data files; and combining, the content downloading module, the separate and distinct intermediate data files corresponding to each of the portions of the data into a consolidated data file based on the user specific parameters, the consolidated data file being stored in the data storage device.

12. The method of claim 11, the content downloading module further configured to execute the plurality of download content portion requests by:

generating, by the content downloading module, a plurality of browser windows in a web browser associated with the source identifier and based on the iteration quantity;

inserting, by the content downloading module, the user specific parameters into each of the browser windows of the web browser, wherein each browser window downloads a portion of the data; and executing, by the content downloading module, each browser window in sequence or concurrently.

13. The method of claim 11, the content downloading module further configured to execute the plurality of download content portion requests by:

generating, by the content downloading module, a browser window in a web browser associated with the source identifier; and iteratively looping, by the content downloading module, through the portions of the data using the browser window by passing the user specific parameters as input parameters to the browser window, wherein each loop iteration includes the change for each iteration.

14. The method of claim 11, further comprising:

dividing, by the content downloading module, the portions of the data into equal-size download content portions according to the entered iteration quantity.

15. The method of claim 11, wherein the source identifier is a network address or a uniform resource locator (URL) address associated with the data repository.

16. The method of claim 11, wherein the plurality of download content portion requests are issued over multiple network connections.

17. The method of claim 16, further comprising:

receiving, by the content downloading module, the portions of the data over the multiple network connections, wherein at least two of the portions of the data are received simultaneously over separate network connections of the multiple network connections.

18. The method of claim 11, the content downloading module further configured to analyze the source code associated with the source identifier by:

receiving, by the content downloading module, a hypertext markup language (HTML) associated with the source identifier; and analyzing, by the content downloading module, the HTML for content delivery fields associated with downloading the portions of the data.

19. The method of claim 11, the method further comprising:

recording and maintaining, by the content downloading module, download status information of the portions of the data.

20. The method of claim 11, further comprising acquiring the source identifier and receiving the user specific parameters using an enhanced browser.

* * * * *